(12) United States Patent
Pudney et al.

(10) Patent No.: US 8,238,901 B2
(45) Date of Patent: Aug. 7, 2012

(54) PROVISION OF POSITION INFORMATION IN TELECOMMUNICATIONS NETWORKS

(75) Inventors: Christopher David Pudney, Newbury (GB); John Mahony Watson, Newbury (GB)

(73) Assignee: Vodafone Group Services Limited, Newbury, Berkshire (GB)

( * ) Notice: Subject to any disclaimer, the term of this patent is extended or adjusted under 35 U.S.C. 154(b) by 483 days.

(21) Appl. No.: 12/087,627

(22) PCT Filed: Jan. 10, 2007

(86) PCT No.: PCT/GB2007/000062
§ 371 (c)(1),
(2), (4) Date: Jan. 12, 2009

(87) PCT Pub. No.: WO2007/080399
PCT Pub. Date: Jul. 19, 2007

(65) Prior Publication Data
US 2009/0156201 A1   Jun. 18, 2009

(30) Foreign Application Priority Data
Jan. 12, 2006   (GB) .................................. 0600601.9

(51) Int. Cl.
*H04W 4/00* (2009.01)
*H04W 24/00* (2009.01)
(52) U.S. Cl. .................................. 455/426.1; 455/456.5
(58) Field of Classification Search ............... 455/426.1, 455/456.5
See application file for complete search history.

(56) References Cited

U.S. PATENT DOCUMENTS

| 6,393,285 | B1 * | 5/2002 | Stephens ..................... 455/435.1 |
| 7,212,818 | B2 * | 5/2007 | Haumont ..................... 455/435.1 |
| 2004/0203773 | A1 * | 10/2004 | Balasubramanian et al. .......................... 455/435.1 |

FOREIGN PATENT DOCUMENTS

EP    1223777 A2    7/2002
WO   WO 02/03719 A2    1/2002

* cited by examiner

*Primary Examiner* — Jinsong Hu
*Assistant Examiner* — Jean Chang
(74) *Attorney, Agent, or Firm* — Muirhead and Saturnelli, LLC (57) ABSTRACT

A mobile or cellular telecommunications network includes a plurality of terminals which are registered. The terminal may be fixed in position, such as a terminal in a vending machine. Alternatively, the terminal may be fixed to a vehicle used for sending an SOS message when the vehicle is involved in an accident. The terminal may be immobile, and therefore does not need to continually advise the network of its location. The terminal may not receive incoming calls or other communications. The terminals therefore may not require paging by the network. In the embodiments described, such terminals are assigned a special terminal type identifier which indicates to the network that these terminals do not require paging. The way in which the network interacts with the terminals is adjusted so that signaling to perform location updates is eliminated or at least reduced.

20 Claims, 5 Drawing Sheets

PROVISION OF POSITION INFORMATION IN TELECOMMUNICATIONS NETWORKS

FIELD OF THE INVENTION

The present invention relates to a telecommunications network with which a plurality of telecommunications terminals are registered, and to a method of operating such a network.

BACKGROUND TO THE INVENTION

Currently, cellular or "mobile" telecommunications terminals and networks are configured and operated in a manner that assumes that all terminals are equally mobile and that all terminals will regularly receive incoming calls. In particular terminals are configured to periodically (regularly) provide the network with which they are registered with their position. This allows the terminal to be "paged" efficiently by the network when an incoming call needs to be routed by the network to the terminal.

It may be desirable to incorporate cellular or "mobile" terminals (either 2G, 3G or combined) into many other pieces of equipment (eg vending machines, security alarms, etc). These terminals might generate very small quantities of traffic and hence it is desirable to reduce the amount of network resources that they consume. Some of these devices may also have low (or no) geographic mobility.

Typically, an idle GSM/UMTS terminal might "consume" the following resources:
  VLR capacity in the MSC/VLR
  MSC processing capacity for handling (periodic) location area updates and TMSI reallocation and occasional re-authentication.
  SGSN processing capacity for handling (periodic) routeing area updates and P-TMSI reallocation and occasional re-authentication.
  radio resources and RNC/BSC resources for handling the MM/GMM signalling;
  MAP signalling from MSC and SGSN to the HLR/HSS for new authentication triplets/vectors;
  HLR capacity
  AUC capacity in generating triplets/vectors
  GGSN resources for maintaining active PDP context(s)
  IP address(es) if a PDP context is kept active
  IMS server capacity if the mobile registers
  one or more MSISDNs
  prepay/billing system capacity
  customer care system resources.

Another type of terminal that will generally generate very small quantities of traffic in the network, but which will have significant geographic mobility, are eCall terminals. As part of the EU eSafety initiative, it is expected that all new cars from 2009 onwards will be fitted with an eCall terminal that will establish an emergency voice call to a Public Safety Answering Point (PSAP) when the car is involved in an accident. The voice call will be automatically set up on detection of an accident—typically, by activation of one or more of the car's air bags. Eventually, eCall terminals are likely to be fitted to more than two million vehicles in the EU. If the eCall terminals operate with the mobile telecommunications network in the same manner as a conventional terminal, this will result in a huge amount of network signalling, particularly to perform regular location area updates/routing area updates as the cars move.

Operating all terminals to update the network with their position at the same regular period is an unnecessary waste of network resources for terminals that receive no or relatively few incoming calls and/or that are relatively immobile.

SUMMARY OF THE INVENTION

According to a first aspect of the present invention, there is provided a mobile or cellular telecommunications network with which a plurality of telecommunications terminals are registered, the terminals being operable to signal their position to the network, and wherein the network instructs respective terminals to signal their position at a time in dependence upon the identity of the terminal.

The network may include means for paging each terminal in accordance with the signalled position of the terminal. In the embodiments, such "paging" is the type of paging performed conventionally by GSM and UMTS networks when an incoming call needs to be routed to a terminal. The paging procedure is intended to identify the location of the terminal within the network so that the incoming call may be properly routed to the terminal. In a conventional network, the terminals periodically signal their position to the network so that this paging procedure can be performed efficiently.

In the embodiment the mobile or cellular telecommunications network includes a radio access network which comprises a plurality of geographically distributed cells, respective groups of these cells being allocated to respective regions of the network. The signalled position is the region occupied by the terminal. Such regions may be a location area (LA), the position being signalled by performing a location area update (LAU). Alternatively, the region may be a routing area (RA), the position being signalled by performing a routing area update (RAU).

The identifier may be assigned to only selected terminals, this assigning being made in dependence upon the frequency of the paging of those selected terminals is likely to be required. For example, the identifier may be assigned to ones of the terminals with a relatively low expected paging frequency. By so assigning the identifier, the elements of the network are able to identify terminals that will not require paging, or will require only infrequent paging, and can handle these terminals appropriately. For example, terminals with the identifier may be preferentially purged from the SGSN with which they are registered, compared to other terminals that do not have such an identifier.

Terminals with a relatively low expected paging frequency may be, for example, terminals that are relatively immobile, or are expected to receive relatively few incoming calls. A relatively immobile mobile terminal might be one incorporated in a vending machine. Another example of such a terminal is a terminal incorporated in a burgular alarm.

A terminal that receives relatively few incoming calls may be an "eCall" terminal incorporated in a car. Such a terminal will never or only rarely receive incoming calls. Such a terminal is operated to make an outgoing call when it is detected that the car has been involved in a collision. A telecommunications terminal incorporated in a vending machine or a burgular alarm is also likely to receive no or relatively few incoming calls.

The time is preferably a selected time of day and/or date—for example 23 seconds after 03:20. Conventionally, only the time period between LAUs/RAUs is specified; the absolute time is not conventionally specified.

According to a second aspect of the present invention, there is provided a mobile or cellular telecommunications network with which a plurality of telecommunications terminals are registered, the terminals being operable to signal their position to the network for facilitating paging of each terminal by the network, wherein each terminal is provided with an identifier that is indicative of the frequency with which the paging is likely to be required, and wherein the identifier is used by the network to control interaction between the network and the terminal.

In the embodiments the identifier is used by the network to control when the terminal is deleted from the storage in one or more network elements (for example, the information about the terminal could be deleted in the S-CSCF, GGSN and SGSN while information is retained in the MSC and HLR/HSS). Advantageously, the identifier is allocated to terminals which have an expected low paging frequency. This identifier is used by the network to preferentially detach terminals with the identifier from a network element with which they are registered, such as an SGSN, without informing the terminal.

The embodiments provide an arrangement which is particularly advantageous for machine-to-machine communications or machine-to-network communications. That is, communications that are automated and do not usually involve a human user. In the embodiments the frequency with which a periodic routing area update (PRAU) and/or a periodic location area update (PLAU) is adjusted in dependence upon the expected paging requirements of terminals. The regular PRAUs or PLAUs that are conventionally performed by each mobile terminal and registered with the network are not necessary for terminals that do not receive incoming calls and/or that do not move. The embodiments provide a mechanism by which this unnecessary PRAU/PLAU signalling can be avoided for terminals for which it serves no useful purpose, thereby saving valuable network resources.

BRIEF DESCRIPTION OF THE DRAWINGS

For a better understanding of the present invention embodiments will now be described by way of example, with reference to the accompanying drawings, in which.

In the drawings like elements are generally designated with the same reference sign.

DETAILED DESCRIPTION OF EMBODIMENT OF THE INVENTION

Figure 1:
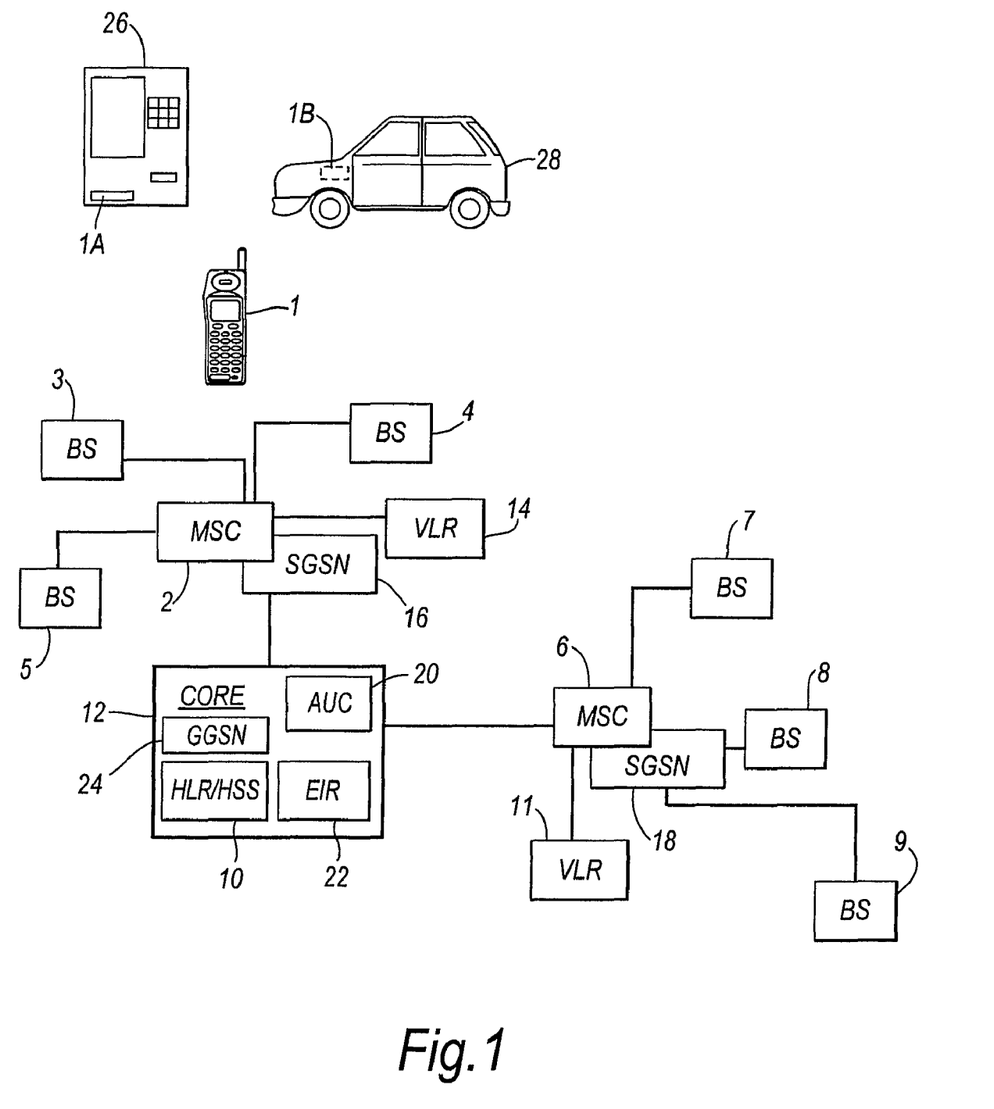
FIG. 1 is a diagrammatic drawing of key elements of a mobile telecommunications network for use in explaining the operation of such a network.

Key elements of a mobile telecommunications network, and its operation, will now briefly be described with reference to FIG. 1.

Each base station (BS) corresponds to a respective cell of its cellular or mobile telecommunications network and receives calls from and transmits calls to a mobile terminal in that cell by wireless radio communication in one or both of the circuit switched or packet switched domains. Such a subscriber's mobile terminal (or User Entity-UE) is shown at 1. The mobile terminal may be a handheld mobile telephone, a personal digital assistance (PDA) or a laptop computer equipped with a datacard.

In a GSM mobile telecommunications network a BSC may control more than one BTS. The BTSs and BSCs comprise the radio access network.

In a UMTS mobile telecommunications network an RNC may control more than one node B. The node B's and RNC's comprise the radio access network.

Conventionally, the base stations are arranged in groups and each group of base stations is controlled by one mobile switching centre (MSC), such as MSC 2 for base stations 3,4 and 5. As shown in FIG. 1, the network has another MSC 6, which is controlling a further three base stations 7, 8 and 9. In practice, the network will incorporate many more MSCs and base stations than shown in FIG. 1.

Each subscriber to the network is provided with a smart card or SIM which, when associated with the user's mobile terminal identifies the subscriber to the network. The SIM card is pre-programmed with a unique identification number, the "International Mobile Subscriber Identity" (IMSI) which is not visible on the card and is not known to the subscriber. The subscriber is issued with a publicly known number, that is, the subscriber's telephone number, by means of which calls to the subscriber are initiated by callers. This number is the MSISDN.

The network includes a home location register (HLR)/home subscriber server (HSS) 10 which, for each subscriber to the network, stores the IMSI and the corresponding MSISDN together with other subscriber data, such as the current or last known MSC and SGSN of the subscriber's mobile terminal. The HSS is the master database for the network, and while logically it is viewed as one entity, in practice it will be made up of several physical databases. The HSS holds variables and identities for the support, establishment and maintenance of calls and sessions made by subscribers. As well as the basic HLR/authentication functions, the HSS may be enhanced through the use of additional databases and reference points. This enables the network to offer the subscriber advanced services and features by interfacing with service application servers based on CAMEL, OSA (Open Service Access) and SIP.

When the subscriber wishes to activate their mobile terminal in a network (so that it may make or receive calls subsequently), the subscriber places their SIM card in a card reader associated with the mobile terminal (terminal 1 in this example). The mobile terminal 1 then transmits the IMSI (read from the card) to the base station 3 associated with the particular cell in which the terminal 1 is located. In a traditional network, the base station 3 then transmits this IMSI to the MSC 2 with which the BS 3 is registered. In a network using the functionality described in 3GPP TS 23.236, the base station follows prescribed rules to select which MSC to use, and then transmits this IMSI to the selected MSC.

MSC 2 now accesses the appropriate storage location in the HLR/HSS 10 present in the network core (CN) 12 and extracts the corresponding subscriber MSISDN and other subscriber data from the appropriate storage location, and stores it temporarily in a storage location in a visitor location register (VLR) 14. In this way, therefore the particular subscriber is effectively registered with a particular MSC (MSC 2), and the subscriber's information is temporarily stored in the VLR (VLR 14) associated with that MSC. The information stored on the VLR 14 includes a Temporary Mobile Subscriber Identification (TMSI) number for identification purposes for the terminal with the MSC 2 similar to the IMSI in network use. The TMSI number is an identification number that is typically 32 bits in length. In conventional systems, therefore, the TMSI number is not allocated to more than one user of a given system served by that MSC at one time. Consequently, the TMSI number is usually invalidated when the mobile station crosses into a new location served by a different MSC.

When the HLR/HSS 10 is interrogated by the MSC 2 in the manner described above, the HLR/HSS 10 additionally uses data from the Authentication Centre (AuC) 20 to perform an authentication procedure for the mobile terminal 1. The HLR/HSS 10 transmits authentication data from the AuC 20 to the MSC 2 in "challenge" and "response" forms. Using this data, MSC 2 passes a random "challenge" (RAND) to the mobile terminal 1 through base station 3. Upon receipt of this data, the mobile terminal 1 passes this data to its SIM and produces a signed "response" (SRES). This response is generated using an encryption algorithm on the SIM and a unique Ki on the SIM. The response is transmitted back to the MSC 2 which checks it against its own information for the subscriber which checks it against information that it has obtained for that subscriber from the HLR/HSS 10 in order to complete the authentication process. If the response from the mobile terminal 1 is as expected, the mobile terminal 1 is deemed authenticated. At this point the MSC 2 requests subscription data from the HLR/HSS 10. The HLR/HSS 10 then passes the subscription data to the VLR 14.

Additionally the International Mobile Equipment Identity (IMEI) of the terminal 1 may be checked against the Equipment Identity Register (EIR) 22 to determine whether the terminal 1 is recorded as stolen or malfunctioning, for example.

The authentication process will be repeated at regular intervals while the mobile terminal 1 remains activated and can also be repeated each time the mobile terminal makes or receives a call, if required.

Each of the MSCs of the network (MSC 2 and MSC 6) has a respective VLR (14 and 11) associated with it and operates in the same way as already described when a subscriber activates a mobile terminal in one of the cells corresponding to one of the base stations controlled by that MSC.

When the subscriber using mobile terminal 1 wishes to make a call, having already inserted the SIM card into the reader associated with this mobile terminal and the SIM has been authenticated in the manner described, a call may be made by entering the telephone number of the called party in the usual way. This information is received by the base station 3 and passed on to MSC 2. MSC 2 routes the call towards the called party. By means of the information held in the VLR 14, MSC 2 can associate the call with a particular subscriber and thus record information for charging purposes.

The MSCs 2 and 6 support communications in the circuit switched domain—typically voice calls. Corresponding SGSNs 16 and 18 are provided to support communications in the packet switched domain—such as GPRS data transmissions. The SGSNs 16 and 18 function in an analogous way to the MSCs 2 and 6. The SGSNs 16, 18 are equipped with an equivalent to the VLR for the packet switched domain. The network is provided with a Gateway GPRS Support Node (GGSN) 24 to support IP-based communications with other entities.

From the description above, it will be understood that the coverage area of a mobile telecommunications network is divided into a plurality of cells, each of which is served by a respective base station. In order to allow a mobile terminal to maintain a call when the mobile terminal moves outside the coverage area of a cell, the call must be switched to an alternative cell automatically. The call must be routed to the new cell before handover can be effected whilst maintaining the connection with the old cell until the new connection is known to have succeeded. Handover is a time critical process requiring action to be taken before the radio link with the original cell degrades to such an extent that the call is lost. Handover requires synchronisation of events between the mobile terminal and the network.

When a calling party (whether a subscriber within the mobile telecommunications network or outside it) attempts to call a mobile terminal within the network, that mobile terminal must be paged. Paging is a process of broadcasting a message which alerts a specific mobile terminal to take some action—in this example, to notify the terminal that there is an incoming call to be received. If the network knows in which cell the mobile terminal is located, it is only necessary to page in that cell. However, if the mobile terminal is moving within the network, the precise cell in which the mobile terminal is located may not be known. It will therefore be necessary to perform paging in a number of cells. The greater the number of cells in which paging must occur, the more use of valuable signalling capacity within the network.

However, if the HLR is to always have an up-to-date record of the cell in which each mobile terminal is located so that the current cell which is occupied by a terminal is always known, this will require a large amount of location updating signalling between the mobile terminal and the HLR in order that the HLR has up-to-date records of the cells occupied by each mobile terminal. This is also wasteful of valuable signalling capacity.

As indicated above, the HLR is updated each time a mobile terminal moves from the coverage area of one MSC to another MSC and from one SGSN to another SGSN. However, typically the area covered by a single MSC and SGSN is large, and to page all the cells covered by a single MSC and SGSN would require a significant amount of paging signalling.

The problems of excessive use of signalling capacity by paging a multiplicity of cells or performing a multiplicity of frequent location updates is solved in a known manner by dividing the coverage area of the mobile telecommunications network into a plurality of location areas (LAs) and into a plurality of routing areas (RAs).

A location area relates to a particular geographical area for communications in the circuit-switched domain. Typically, although not necessarily, a location area is larger than the area of a single cell but is smaller than the area covered by one MSC. Each cell within the network broadcasts data indicative of the identity of its location area (LAI). The mobile terminal uses this data to determine when it has moved into a new location area. The terminal stores its last known location area on its SIM. This information stored on the SIM is compared with the location area information broadcast by the local cell. The identities of the two location areas are compared. If they are different, the mobile terminal determines that it has entered a new location area. The mobile terminal then gains access to a radio channel and requests a location area update (LAU). The request includes the now out-of-date LAI and the terminal's current TMSI. If the MSC/VLR is the same for the new and old location areas, the network can immediately authenticate the mobile terminal and note the change of location area. However, if the mobile terminal is moved to a different MSC/VLR, the MSC/VLR addresses a message to the HSS/HLR. The HSS/HLR notes the new location and downloads security parameters to allow the network to authenticate the mobile. It also passes on subscription details of the user to the new VLR and informs the old VLR to delete its records. The new MSC/VLR allocates a new TMSI to the mobile.

A routing area relates to a particular geographical area for communications in the packet-switched domain. Typically, although not necessarily, a routing area is larger than the area of a single cell but is smaller than the area covered by one SGSN. A routing area is typically, although not necessarily, smaller than a location area. There may be many routing areas within one location area. Each cell within the network broadcasts data indicative of its routing area (RAI) (in addition to the data mentioned above indicative of the identity of its location area). The mobile terminal uses this received data to determine when it has moved to a new routing area. The terminal stores the last known routing area on its SIM. The information stored on the SIM is compared with the routing area information broadcast by the local cell. The identities of the two routing areas are compared. If they are different, the mobile terminal determines that it has entered a new routing area. The mobile terminal then gains access to a radio channel and requests a routing area update (RAU). The routing area is updated in the same manner as the location area, as discussed above.

In addition to the LAU and RAU performed in the manner described above—as a result of movement of the mobile terminal or signal fade—the network also instructs each mobile terminal to periodically (at regular intervals) report its location (its LA or RA) to the network by the mobile terminal performing a Periodic Location/Routing Area Update (PLAU or PRAU). The network provides each mobile terminal registered therewith with an instruction, indicating the frequency with which PLAUs/PRAUs should be performed. Typically all mobile terminals registered with a network will be instructed to perform such updates at the same frequency—for example, every 120 minutes. Conventionally, the actual (absolute) time (for example, a specified time of day) that an update is to be performed is not included in the instruction: just the period between updates is specified (for example, every 120 minutes).

The primary purpose of the PLAU or PRAU sent by the mobile terminal is to provide the network with an indication that the mobile terminal is still registered and active. During these procedures, the Radio Access network provides the current serving cell's identity to the MSC and/or SGSN. If the network does not receive a PLAU or PRAU then, after a first extra timer expires, it need not page the mobile and, after, typically, a much larger time passes, it may purge the mobile terminal's subscription information from the VLR.

In the embodiments of the invention to now be described in detail, the terminals registered with the network have unusual mobility patterns and/or unusual call patterns. The mobility/call patterns are such that there is no or relatively little requirement for the terminals to be paged by the network.

In the first embodiment the terminal 1A is incorporated in a vending machine 26 that is fixed in position—for example, attached to the wall of a building. Because the terminal 1A and vending machine are fixed in position, once the network has been provided with an indication of the position of the terminal 1A, the network has no need for periodic updates of the terminal 1A's position. The network will always know in which cell the terminal 1A is located, and can therefore direct calls to the terminal 1A to that cell, without requiring paging of the terminal 1A using the routing area/location area information in the conventional manner discussed above. Accordingly, there is no need for the terminal 1A to perform periodic routing area updates/location area updates. In accordance with an important feature of the embodiment, the subscriber data of the terminal 1A stored on the HLR/HSS 10 is modified to include a terminal type identifier (TTID). For example, this terminal type identifier could be set to "FIXED". This terminal type identifier can be used by the elements of the network to identify that the terminal 1A is a fixed terminal and to interact with that terminal accordingly.

In the first embodiment the terminal 1A operates in the packet switched (PS) domain. The GPRS Mobility Management (GMM) message sequence performed in accordance with the first embodiment will now be described with reference to FIGS. 2A to 2D.

Figure 2A:
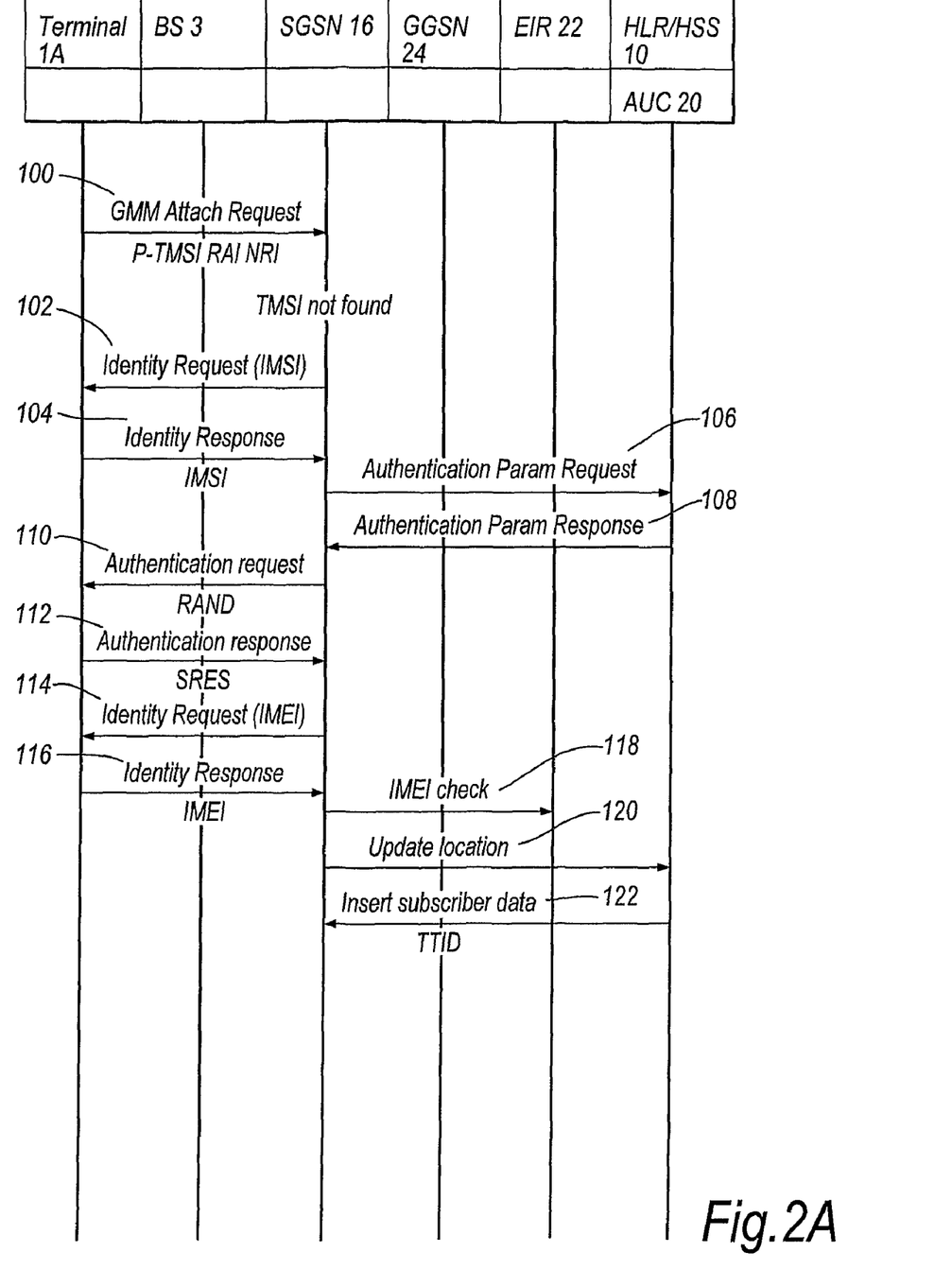
FIGS. 2A to 2D show the messages transmitted between a terminal and the telecommunications network of FIG. 1 in accordance with an embodiment of the invention.

Following manufacture and installation of the vending machine 26 (and terminal 1A incorporated therein), the terminal 1A is not connected to the network. That is, the terminal 1A is detached from the network, and no communication between the terminal and the network occurs. The terminal and the network hold no valid location or routing information. Upon powering up of the terminal 1A, the terminal 1A generates a "GMM attach request" message 100. This message may potentially include the previously assigned PS domain TMSI (P-TMSI), routing area identifier (RAI) and network resource identifier (NRI). However, in this instance, the terminal 1A has not been operated before, and therefore will not have this data stored and hence this information is not present in this GMM attach request message 100; instead the mobile's IMSI is included. However, when any subsequent GMM attach request message is sent, it will include the most recently stored P-TMSI, RAI and NRI. The GMM attach request message 100 is transmitted via BS 3 to SGSN 16. The presence of an IMSI in the GMM attach request message 100 will be noted by the SGSN 16 and, typically, the SGSN 16 determines that it has no subscriber data for the terminal 1A temporarily stored therein.

If the SGSN 16 receives a P-TMSI and RAI combination in the GMM attach request message which the network cannot associate with a subscriber record, the SGSN 16 issues an "identity request" message 102 that is transmitted to the terminal 1A via the BS 3, requesting the IMSI of the terminal 1A.

On receipt of the identity request message 102, the terminal 1A generates an "identity response" message 104, which contains the IMSI of the terminal 1A.

When the identity response message 104 is received by the SGSN 16, the SGSN 16 then generates an "authentication parameter request" message 106. The authentication parameter request message 106 is sent to the HLR/HSS 10 in the core network 12. Data from the AUC 20 is retrieved in the conventional manner in order to authenticate the terminal 1A.

The HLR/HSS 10 then generates an "authentication parameter response" message 108, including a random challenge, RAND and the expected response, SRES. The authentication parameter response message 108 is transmitted to the SGSN 16.

On receipt of the authentication parameter response message 108, the SGSN 16 then generates an "authentication request" message 110, including the RAND. The mobile terminal 1A then generates a signed response, SRES in the conventional manner described above and returns this to the SGSN 16 in "authentication response" message 112.

Optionally, the SGSN 16 may request the IMEI from the mobile terminal 1A. "Identity Request" message 114, requesting the IMEI of the terminal 1A is then transmitted from the SGSN 16 to the terminal 1A.

The terminal 1A then provides its IMEI in a "identity response" message 116.

On receipt of the identity response message 116, the SGSN 16 may then generate a "IMEI check" message 118 which is transmitted to the EIR 22. The EIR 22 is then operable to check its records to determine whether the terminal 1A is recorded as stolen or malfunctioning.

Figure 2B:
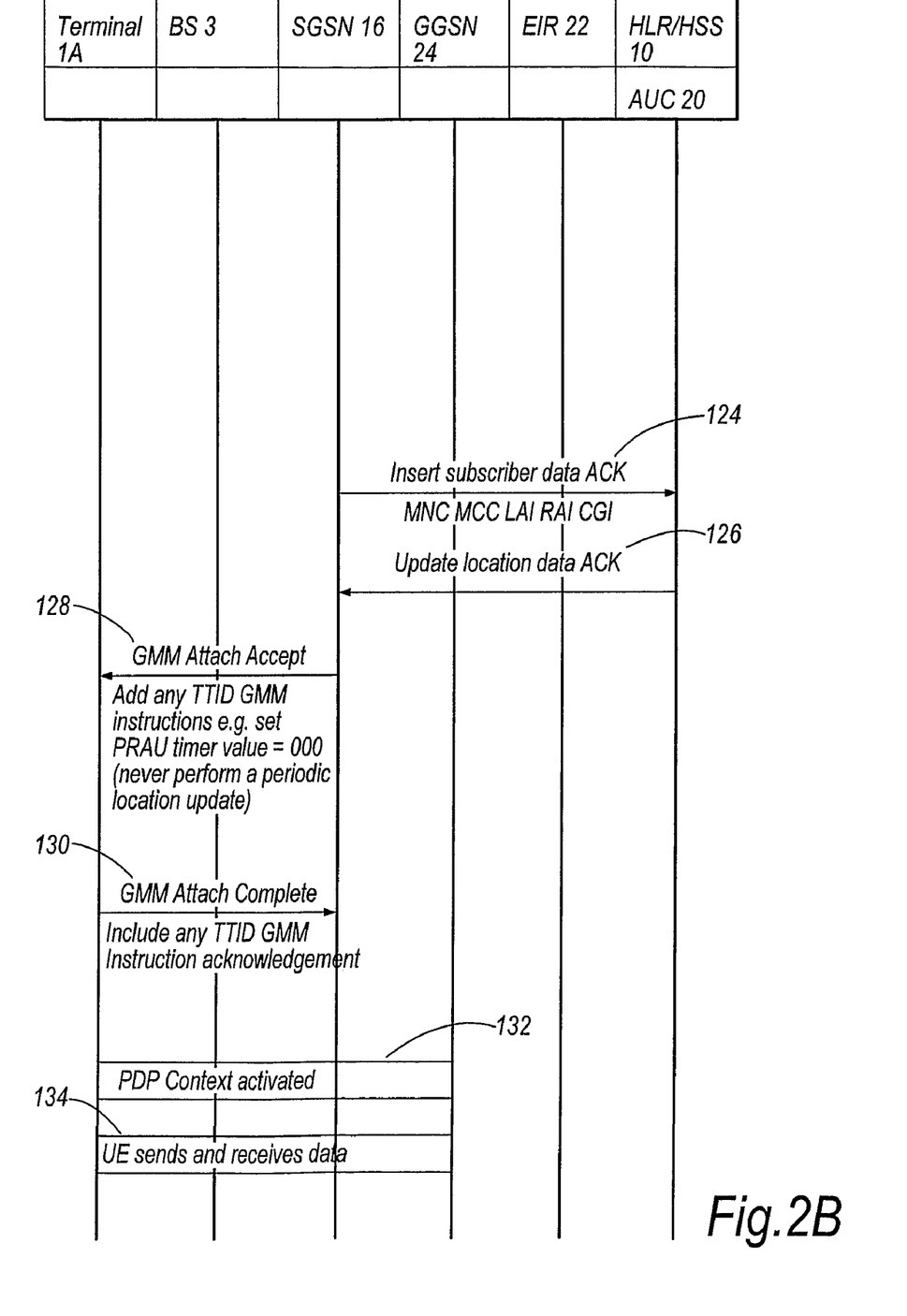

The SGSN 16 then sends an "update location" message 120 to the HLR/HSS 10, which indicates the successful authentication of the mobile in SGSN 16. The HLR/HSS 10 returns subscription information to the SGSN in the "insert subscriber data" message 122. In accordance with an important feature of this embodiment, the subscriber data transmitted by the HLR/HSS 10 in the insert subscriber data message 122 includes a terminal type identifier (TTID) value—for example, which in this case would be set to "FIXED".

The SGSN 16 is arranged to interpret the terminal type identifier and to adopt a particular mobility management procedure for this category of terminal. For example, the terminal type identifier may cause the SGSN to instruct the terminal 1A not to initiate periodic routing area updates. The terminal type identifier may also cause the SGSN to purge details of the terminal 1A from the SGSN 16 more readily than terminals which do not have the terminal type ID set to "FIXED". For example, the SGSN 16 may be programmed to purge terminals after a set period of inactivity. This program may be modified to have a shorter period for terminals which have the terminal type ID "FIXED".

The SGSN 16 generates "insert subscriber data ACK" message 124 and sends this to the HLR/HSS 10. The insert subscriber data ACK message 124 acknowledges receipt of the subscriber data and the terminal type identifier from the HLR/HSS 10, and includes the Routing Area Indicator (RAI) and the mobile's last known Cell Global Identity. The RAI includes the Mobile Network° Code (MNC), Mobile Country Code (MCC) and Location Area Code (LAC). The RAI is generated by the SGSN 16 to identify the location of the terminal 1A to the HLR/HSS 10. HLR/HSS 10 stores the RAI and CGI. If terminal 1A also operates in the circuit switched domain, then a Location Area Indicator (LAI) is also sent by the CS domain.

The HLR/HSS 10 then acknowledges the updated location data (RAI/LAI) by returning the "update location data ACK" message 126 to the SGSN 16.

The SGSN 16 generates a "GMM Attach Accept" message 128. In accordance with a feature of this embodiment, the GMM Attach Accept message 128 may include additional GMM instructions, such as instructions to set the Periodic Routing Area Update (PRAU) timer value of terminal 1A to a particular value in dependence upon the terminal type identifier. The PRAU timer value may be between 000 and 256. Conventionally, the PRAU timer is set to the same value for all terminals, for example so that the terminal performs a RAU every two hours. However, because the terminal type identifier is "FIXED", the SGSN 16 may instruct the PRAU timer to be set to 000, which causes the terminal 1A never to perform a RAU. Alternatively, the PRAU timer value can be set to the maximum value of 255, which causes the terminal 1A to perform only an RAU at the maximum time period conventionally allowed, of 25.5 hours.

In accordance with an important feature of this embodiment, the PRAU timer value may be set to 000, and an additional instruction may be included in the GMM Attach Accept message 128, which instructs the terminal 1A to perform a RAU at a particular date and time (that is, not at a predetermined time interval but at an absolute time and date). For example, the GMM Attach Accept message 128 could instruct the terminal 1A to perform a RAU during the middle of a weekend night, for example on 13 Jan. 2007 at 23 seconds after 03:20. The GMM Attach Accept message 128 may also instruct the terminal 1A to initiate a GMM DETACH after a predetermined time interval or after a particular event, such as completion of a data transaction.

Further, the terminal 1A may be instructed to perform low periodicity updates—for example, weekly or monthly.

Figure 2C:
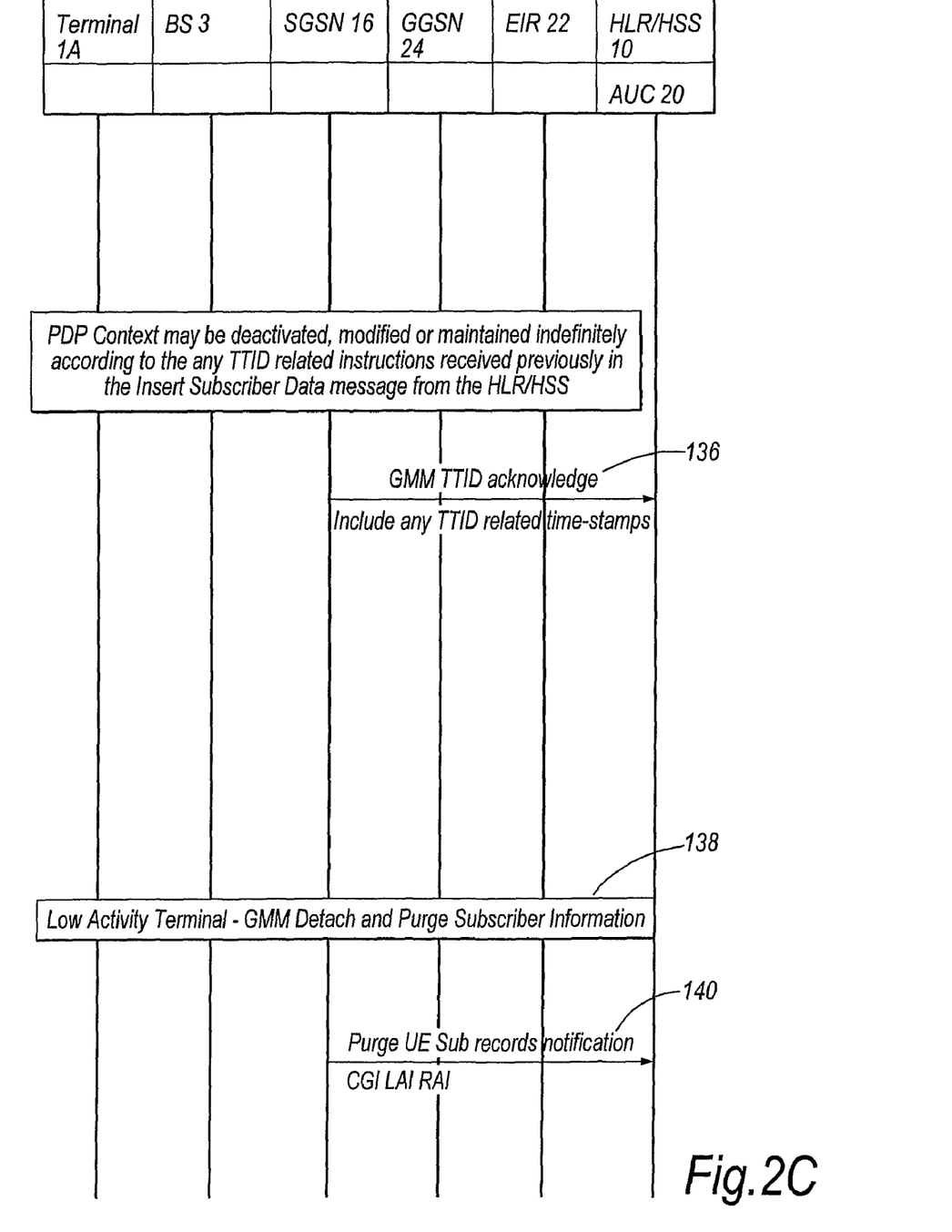

When the terminal 1A has completed the GMM ATTACH procedure, it acknowledges the terminal type identifier instructions by sending "GMM Attach Complete" message 130 to the SGSN 16. The terminal 1A may then initiate the PDP context activation procedure 132.

The GGSN 24 (as determined by the APN address stored in the terminal 1A and/or downloaded to SGSN 16 by HLR/HSS 10) authenticates the subscriber at a RADIUS server of the network and issues a dynamic IP address. The dynamic IP address is passed to the SGSN 16, and the SGSN 16 then sends an activate PDP CONTEXT ACCEPT message to the terminal 1A. A PDP CONTEXT 132 is then activated. The PDP context defines parameters that support the flow of data traffic to and from the mobile terminal 1A. Among the parameters that are set are the identifier of the external packet data network with which terminal 1A wishes to communicate, a PDP address recognized in that network (for example, the IP address allocated to the mobile terminal), the address of the GGSN 24, quality of service (QoS) parameters etc. If required, the terminal 1A sends and receives data 134. The SGSN may pass the TTID information to the GGSN.

The PDP CONTEXT may be deactivated, modified or maintained indefinitely by the SGSN and/or GGSN according to the terminal type identifier related instructions received previously in the insert subscriber data message 122 from the HLR/HSS 10.

The SGSN 16 may generate "GMM-TTID ACKNOWLEDGE" message 136, which includes TTID related time stamps. For example, in the GMM-TTID ACKNOWLEDGE message 136 the SGSN 16 may inform the HLR/HSS 10 if and when the terminal 1A has been instructed not to initiate PRAUs. This may apply indefinitely or for an extended period, for example with weekly or monthly PRAUs. The SGSN 16 may also inform the HLR/HSS 10 if and when the SGSN 16 has instructed the terminal 1A to detach from the PS domain. The GMM-TTID ACKNOWLEDGE message 136 includes any time-stamps generated for these events and the last known RAI and CGI of the mobile. The SGSN 16 may use the time-stamp information to determine if the RA coordinates or RA Identity have been altered prior to any paging of the terminal 1A. The HLR/HSS 10 stores the RAI and CGI.

The terminal 1A of the vending machine 36 may never receive incoming communications, and will therefore never require paging. However, occasional incoming communications may be received—for example, to update the software of the vending machine. Advantageously, these updates may be timed to follow shortly after a RAU has been performed by the terminal 1A. Preferably the updates are transmitted whilst the network is not busy with other traffic—for example, a couple of hours after midnight.

Figure 2D:
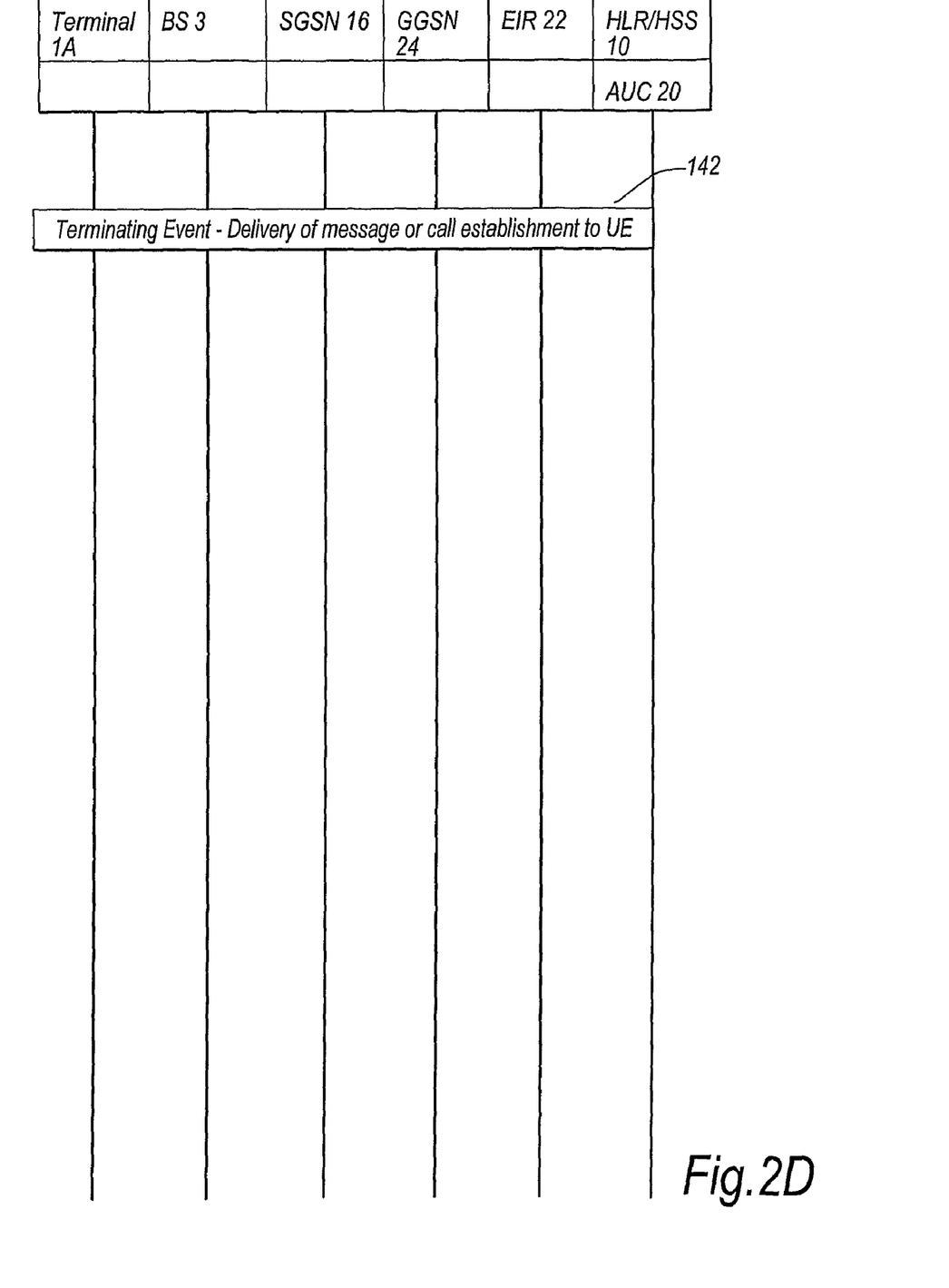

In accordance with the TTID instructions received previously from the HLR/HSS 10, the SGSN 16 may initiate a GMM detach for low activity terminals (e.g. terminal 1A) and/or purge the subscription records from the SGSN—message 138.

The "purge UE subscription records notification" message 140 generated by the SGSN 16 and sent to the HLR/HSS 10 includes the Cell Global Identity (CGI) and the RAI, thereby providing the HLR/HSS 10 with up-to-date location information for the terminal 1A. This location information may be used later to page the terminal 1A, to verify that the terminal 1A has not moved (for security purposes) or to perform authentication based on or linked to the location of the terminal 1A.

After the mobile terminal 1A is detached from the network, and if the network does not have an up to date record of the location of the mobile terminal 1A, a special procedure is adopted in accordance with the embodiment when a "terminating event" 142 occurs, such as the desire to deliver a message or to establish a call with the terminal 1A. The terminating event may be an incoming SMS, MMS, email or data call to the mobile terminal 1A.

If the SGSN 16 has purged the terminal 1A subscriber data then it must request the last known RAI/LAI information from the HLR/HSS 10. The HLR/HSS 10 returns both RAI and CGI to the SGSN 16. The SGSN 16 may use the CI part of the CGI to determine whether or not the cell has been reparented into a new RA.

If the terminal 1A has been detached from the PS domain then an SMS sent via the CS domain may be used to instruct a Class A or B terminal to initiate a GMM ATTACH REQUEST.

The TTID can also be used to improve security of a device that is intended to be immobile. That is, when an RAU or LAU is performed, the network can determine if the device has moved. If movement has occurred, this can be taken as an indication of unauthorized movement or theft. The device could then be shut down by the network and/or the police or security services could be informed.

In the second embodiment of the invention, a car 28 is provided with a terminal 1B for providing the eCall functionality described above. The messages exchanged between the terminal 1B and the elements of the network are generally of the same type and structure as the first embodiment. However, the TTID may be set to "eCall". The SGSN 16 is arranged to interpret the TTID as in the second embodiment and to adopt a different particular mobility management procedure for this category of terminal. For example, the TTID may cause the SGSN 16 to instruct the terminal 1B not to perform periodic RA or LA updates, or to perform these updates at particular dates/times. The TTID may also cause the SGSN 16 to purge details of the terminal 1B from the SGSN 16 more readily than terminals that do not have the terminal type ID set to "eCall". For example, the SGSN 16 may be programmed to purge terminals after a set period of inactivity. This program may be modified to have a shorter period for terminals which have the TTID "eCall". It is appropriate for the SGSN 16 to treat the terminal 1B in this manner because the terminal 1B will never or very rarely receive incoming calls. Therefore, the terminal 1B will not require regular paging by the network, so its location does not need to be regularly updated to the network.

Also, to reduce the load on the SGSN, caused by attached low or inactive terminals, the SGSN may issue a DETACH AND DON'T RE-ATTACH command to the terminal. This instructs the terminal to perform a GMM DETACH and not to attempt to re-attach unless it wishes to establish a new PDP context. The period of inactivity before the SGSN issues the command to the terminal can be set by the network operator. The DETACH AND DON'T RE-ATTACH feature is specified in TS24-008. There are hard limits on the maximum number of active subscribers and PDP contexts that an SGSN can handle at any one time, and when these limits are reached the SGSN will reject any further requests for PDP contexts. It is presumed that during times of high activity, should these limits be reached, requests for secondary PDP contexts might also be rejected. It is therefore advantageous for a subscription type identifier to be used by the SGSN to determine the optimal inactivity time before a DETACH AND DON'T RE-ATTACH command is sent to an inactive/low activity terminal. Alternatively the SGSN could issue the DETACH command dynamically after some period based on an analysis of the terminal's previous behaviour.

In addition, extra information can be added to the CS domain Location Updating Response message sent by MSC 2 to terminal 1B to disable Attach/Detach signaling. This avoids signaling between network and mobile every time the car's engine is started or stopped. This is also beneficial in avoiding radio transmissions to the network in potentially hazardous environments, for example, as currently claimed by petrol filling stations.

In a similar manner, extra information can be added to the PS domain Routing Area Update Accept message sent by SGSN 16 to terminal 1B to instruct it to retain its GMM attached state even if powered down.

The terminal 1B in the second embodiment may operate in the PS and/or CS domains.

In the embodiments the terminals 1A, 1B or the network may initiate the GPRS detach procedure and move to the idle state.

After expiry of the mobile reachable timer (a timer that checks for reception of the PRAU/PLAU of each terminal) the SGSN may perform an implicit detach in order to return the GMM context in the SGSN to an idle state. The GMM and PDP context may then be deleted.

If the network supports the Gs interface (an interface between the SGSN 16 and MSC 2) then it is possible to coordinate attachment and detachment, and LA and RA updates, of terminals that are both GPRS-attached and IMSI-attached.

Class C terminals (PS only) can only be paged in the ready or standby states (not in the idle state). Such devices could be paged by de-synchronising the SGSN 16 and the terminal state machines for some terminal applications.

Existing standards permit the SGSN and MSC/VLR to 'purge' subscribers from their database when the node is reaching full capacity. However, the embodiments enable the HLR/HSS 10 to instruct the MSC 2 and/or SGSN 16 as to those subscribers which are likely to become inactive, and hence to encourage the purging of these subscribers by the SGSN 16 and MSC 2/VLR 14. The SGSN and MSC/VLR need this information from the HLR/HSS so that they can signal to the terminal 1A, 1B to instruct the terminal to disable its periodic routeing area update and periodic location area update functions. This requires new signalling from the MSC/VLR to the terminals, and new functionality in both SGSN and MSC/VLR. In the embodiments the new signaling transmits the TTID and the new functionality performs actions in accordance with the TTID.

To further conserve resources, the SGSN 16 may indicate to the terminal 1A, 1B that the terminal should totally detach from the packet switched domain. In this situation, re-activation of the PS domain is achieved via a command delivered by SMS via the MSC/VLR (in the case of mobile terminating data), or, by the mobile when it actually needs to send mobile originated data.

When the SGSN 16 and/or MSC 3/VLR 14 purge the subscriber from their records, they signal this to the HLR/HSS 10 along with the Routeing Area ID/Location Area ID where the mobile last performed its Routeing/Location Area Update. When a mobile terminating call or SMS arrives for the subscriber, the HLR/HSS 10 signals to the last known MSC/VLR or SGSN. The last known RAI/LAI is passed to the SGSN and/or MSC/VLR, and this permits the initial paging of the user to be performed just in that RAI/LAI. This is beneficial in reducing the network resources used for paging—especially if the network is using "Iu-flex" (Intra-Domain NAS Node Selection functionality) connection of multiple Core Network Nodes to the RNCs/BSCs—because otherwise paging might have to be performed across the whole network. If the initial paging is unsuccessful, the MSC/VLR and/or SGSN can use various known strategies for widening the paging area.

The HLR/HSS 10 may store the times at which the SGSN 16 and MSC 2/VLR 14 purged the subscriber. This time value is signalled along with the RAI or LAI to the SGSN or MSC/VLR when paging is needed. The time value is then used by the SGSN or MSC/VLR to determine whether the RAI or LAI boundaries have been re-configured since the subscriber was purged.

A further optimisation, is to pass unique cell identity (identifying in which cell the terminal performed its RA/LA update) to the HLR/HSS 10 when the terminal is purged, and this unique cell identity is passed back when paging is needed. This is advantageous when individual cells are moved from one RA/LA to another RA/LA.

When mobile terminating traffic arrives, the MSC 2/VLR 14 and/or SGSN 16 can use knowledge of the traffic type (eg voice call, data call or SMS) to determine appropriate paging strategies (eg whether or not retry paging quicker over a larger geographic area).

An additional advantage is that the Operating and Maintenance (O+M) and customer care system may use the TTID to form an additional subscriber category for "FIXED" and "eCall" users to ensure that their long periods of inactivity do not cause them to be deleted/removed from the HLR/HSS 10 and/or pre-pay systems. Additional reporting information is used to ensure that these subscribers are accurately accounted for in the "active subscriber number" information is reported.

Advantages of the embodiments include:
lower machine-to-machine and fixed terminal operating costs resulting from reduced radio and network resource usage;
reduced cell congestion;
enhanced business case for machine-to-machine and machine-to-network communications;
enhanced authentication and security;
possible unauthorised equipment movement detection/alarm and tracking capability; and
potential enhancement for eCall system.

The invention claimed is:

1. A mobile or cellular telecommunications network, comprising:
a plurality of telecommunications terminals which are registered with the network, wherein at least one terminal is provided with an identifier that is indicative of the terminal being of a type with low expected paging frequency, wherein the identifier is usable by the network to control the interaction between the network and the at least one terminal, and wherein the identifier is used by the network to control when a communicating terminal is detached from the network, such that the network detachment results in the communicating terminal being detached from a packet switched domain of the network.

2. The network of claim 1, wherein the identifier is further usable by the network to control when records of the communicating terminal are purged from one or more elements of the network.

3. The network of claim 1, wherein the identifier is used by the network to control when the communicating terminal is detached from a network element with which the communicating terminal is registered without informing the terminal.

4. The network of claim 1, wherein the identifier is used by the network to instruct the communicating terminal to detach from the network after a predetermined time interval or after a particular event completion.

5. The network of claim 1, wherein the identifier is used by the network to control when the communicating terminal is detached from a network element by deactivating a packet data protocol (PDP) context existing between the communicating terminal and the network.

6. The network of claim 1, wherein at least one of the terminals is associated with a low network activity identifier, and wherein the at least one of the terminals is relatively immobile.

7. The network of claim 1, wherein the low paging frequency identifier is associated with at least one terminal which includes an accident notifier incorporated into a vehicle.

8. The network of claim 1, wherein interaction between the network and the plurality of terminals is controlled in dependence upon the identifier by detaching terminals with the identifier from the network in preference over terminals without the identifier.

9. The network of claim 1, wherein reattachment of the detached terminal in the packet switched domain is initiated by sending an attach request message to the detached terminal via a circuit switched domain of the network.

10. The network of claim 1, wherein the network detachment of the communication terminal from the packet switched domain includes issuance of a command that prevents reattachment of the communicating terminal.

11. A method of operating a mobile or cellular telecommunications network with which a plurality of telecommunications terminals are registered,
wherein at least one of the terminals is associated with an identifier that is indicative of the terminal being of a type with low expected paging frequency, the method comprising:
determining that a communicating terminal is associated with the identifier; and
controlling the interaction between the network and the communicating terminal in dependence upon the identifier, wherein the identifier is used by the network to control when the communicating terminal is detached from the network, such that the network detachment results in the communicating terminal being detached from a packet switched component of the network.

12. The method of claim 11, further comprising:
the network using the identifier to control when records of the communicating terminal are purged from one or more elements of the network.

13. The method of claim 11, wherein the identifier is used by the network to control when the communicating terminal is detached from a network element with which the communication terminal is registered without informing the terminal.

14. The method of claim 11, wherein the identifier is used by the network to instruct the communicating terminal to detach from the network after a predetermined time interval or after a particular event completion.

15. The method of claim 11, wherein the identifier is used by the network to control when the communicating terminal is detached from a network element by deactivating a packet data protocol (PDP) context existing between the communicating terminal and the network.

16. The method of claim 11, further comprising:
associating at least one of the terminals with a low network activity identifier, wherein the at least one of the terminals is relatively immobile.

17. The method of claim 11, further comprising:
associating the low paging frequency identifier with at least one terminal which includes an accident notifier incorporated into a vehicle.

18. The method of claim 11, further comprising:
controlling interaction between the network and the plurality of terminals in dependence upon the identifier by detaching terminals with the identifier from the network in preference over terminals without the identifier.

19. The method of claim 11, further comprising:
initiating reattachment of the detached terminal in the packet switched domain by sending an attach request message to the detached terminal via a circuit switched domain of the network.

20. The method of claim 11, wherein the network detachment of the communication terminal from the packet switched domain includes issuance of a command that prevents reattachment of the communicating terminal.

* * * * *